United States Patent [19]

Christensen

[11] Patent Number: 5,255,832

[45] Date of Patent: Oct. 26, 1993

[54] UNIVERSAL EQUIPMENT MOUNTS, ENCLOSED MOUNTS AND MOUNTING RAILS

[76] Inventor: David Christensen, 11 Moores Mill Rd., Pennington, N.J. 08534

[21] Appl. No.: 802,227

[22] Filed: Dec. 4, 1991

[51] Int. Cl.⁵ .............................................. B60R 11/06
[52] U.S. Cl. ............................ 224/42.42; 224/42.44; 296/37.6
[58] Field of Search ................ 224/42.42, 42.45 R, 224/42.43, 42.44, 310; 296/37.6

[56] References Cited

U.S. PATENT DOCUMENTS

| | | |
|---|---|---|
| 2,134,823 | 1/1938 | Herrmann et al. . |
| 3,454,250 | 7/1969 | Gley . |
| 3,727,971 | 4/1973 | Sisler .................. 224/42.42 X |
| 3,826,529 | 7/1974 | Wood .................. 296/37.6 |
| 3,877,624 | 4/1975 | Carson . |
| 4,065,092 | 12/1977 | Spinks. Sr. et al. . |
| 4,170,324 | 10/1979 | Stubbings ............ 224/42.45 R X |
| 4,190,281 | 2/1980 | Chandler ............. 296/37.6 |
| 4,215,898 | 8/1980 | Ulics ................... 224/42.43 X |
| 4,230,248 | 10/1980 | Finnegan . |
| 4,390,117 | 6/1983 | Fagan . |
| 4,444,427 | 4/1984 | Martin ................. 224/42.42 X |
| 4,522,326 | 6/1985 | Tuohy III ............. 224/310 |
| 4,531,774 | 7/1985 | Whatley ............... 296/37.6 |
| 4,564,167 | 1/1986 | Smith ................... 224/42.45 R X |
| 4,573,731 | 3/1986 | Knaack et al. ........ 224/42.42 X |
| 4,751,981 | 6/1988 | Mitchell et al. ...... 224/42.43 X |
| 4,752,095 | 6/1988 | Brady .................. 224/310 X |
| 4,811,877 | 3/1989 | Heideman ............ 224/325 X |
| 4,813,585 | 3/1989 | Nutt .................... 224/325 X |
| 4,911,348 | 3/1990 | Rasor et al. .......... 224/325 X |
| 4,984,837 | 1/1991 | Dise . |
| 5,002,324 | 3/1991 | Griffin ................. 224/42.45 R X |
| 5,007,568 | 4/1991 | Da Vault . |
| 5,088,636 | 2/1992 | Barajas ................ 224/42.42 X |
| 5,092,504 | 3/1992 | Hannes et al. ........ 224/42.45 R |
| 5,137,194 | 8/1992 | Kodis ................... 224/315 X |

FOREIGN PATENT DOCUMENTS 2009589  9/1971  Fed. Rep. of Germany ..... 296/37.6

Primary Examiner—Allan N. Shoap
Assistant Examiner—Christopher McDonald
Attorney, Agent, or Firm—Kenneth P. Glynn

[57] ABSTRACT

The present invention is directed to a universal equipment mount for attachment to mounting rails. The mount includes a base plate which is flat and has at least one cut-out therein. Permanently mounted to the base plate is an over-the-center clamp with an anchor strap and hook that extends through the cut out and the base. The base has opposite ends and one end is curved downwardly and inwardly for fitting over a flat horizontal rail section. The base plate is placed with its hooked portion on the edge of the mounting rail, the anchor hook of the over-the-center clamp is placed on the opposite edge of another horizontal surface of a mounting rail and the clamp is tightened to secure the base plate to the mount. The present invention is also directed to a mounting rail which includes at least two parallel separated base sections that have a cross section including a horizontal and vertical surface. The base sections are connected by spacers which may be at right angles to the vertical surfaces and in the vertical, may be at another angle, or may even be horizontal and/or continuous. Finally, the present invention is directed to the combination of both the universal mount described and the mounting rail.

14 Claims, 4 Drawing Sheets

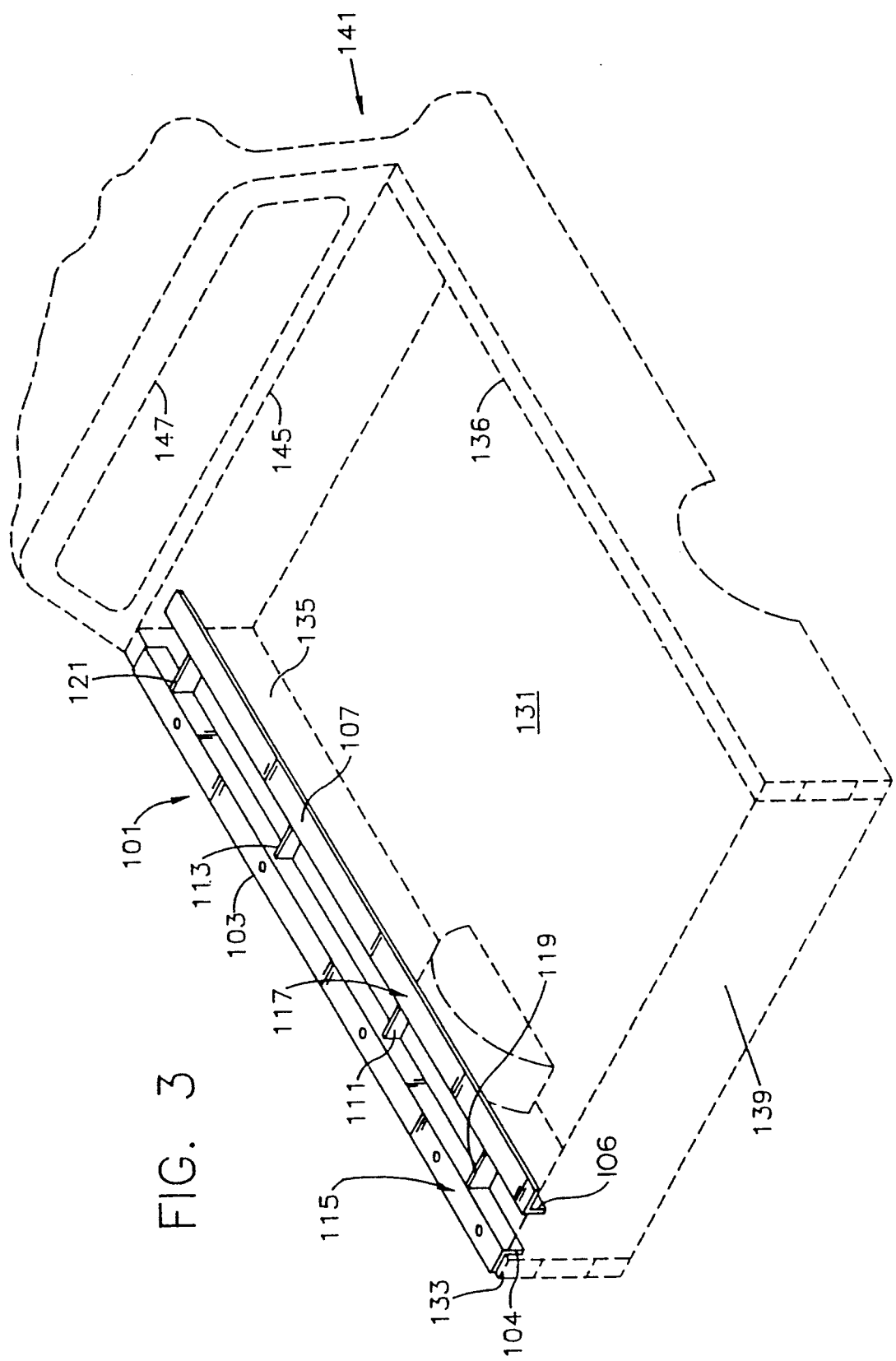

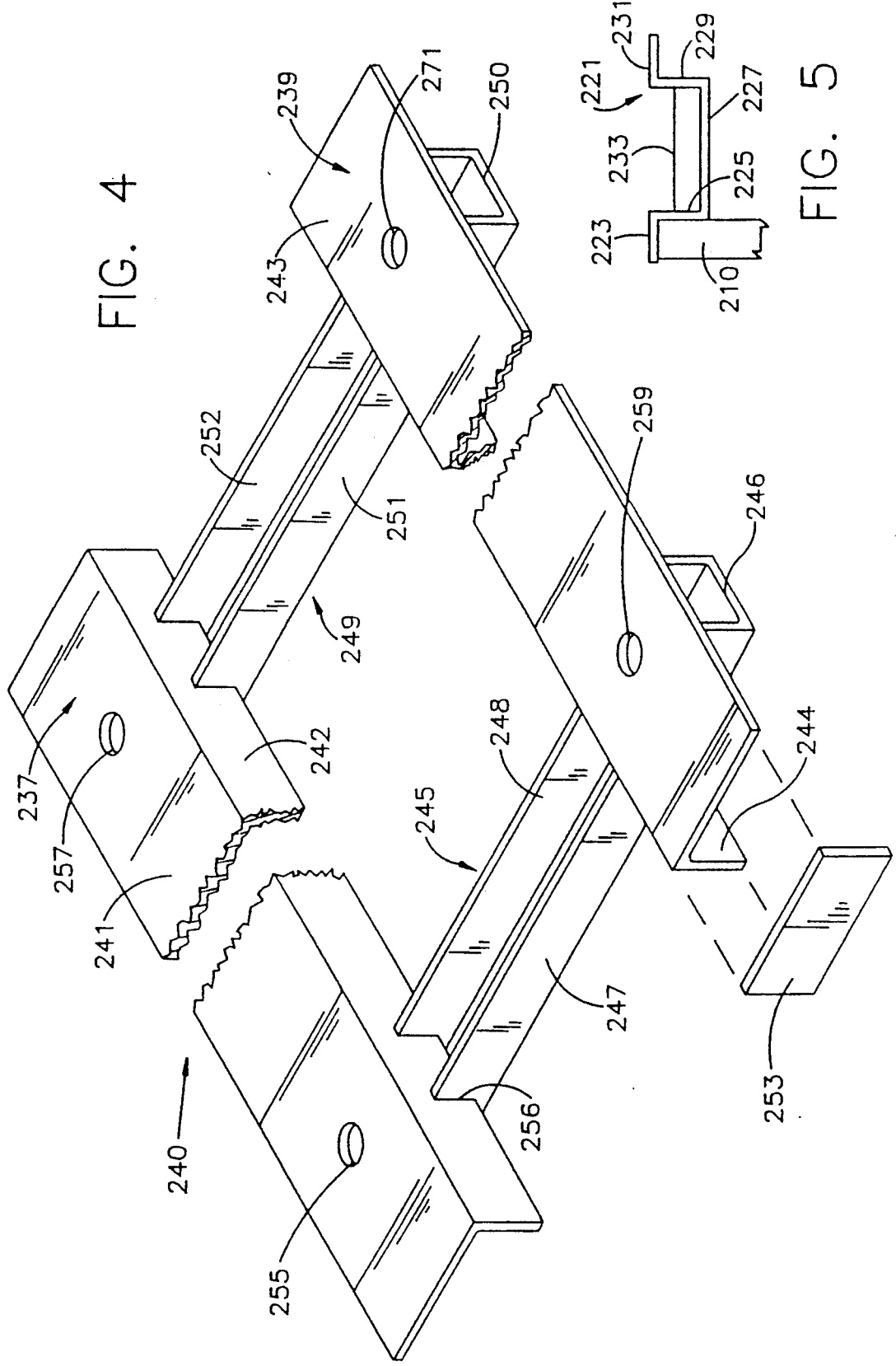

UNIVERSAL EQUIPMENT MOUNTS, ENCLOSED MOUNTS AND MOUNTING RAILS

BACKGROUND OF THE INVENTION

1. Field of the Invention

This invention relates to universal equipment mounts for mounting equipment, either on portable rails, on fixed rails or on rails attached to a vehicle. It is also directed to enclosed mounts for securing equipment, such as tools, as well as other items of value. Finally, it relates to the utility mounting rails themselves to create platforms for attachment of the present invention mounts.

2. Prior Art Statement

With the portability of expensive tools and equipment and the increase in theft, a need has arisen to secure valuables which are typically transported by open vehicle, e.g. a pick-up truck and/or mounted on such vehicles for operation at remote sites. Further, tools and other equipment are taken to and left unattended at worksites and must likewise be secured. Other valuables such as vacation items, exhibits and personal items of a general nature may likewise need to be secured temporarily or long term. The present invention is directed to universal equipment mounts and to mounting rails for such mounts. Some prior art addresses such problems, and the following is exemplary:

U.S. Pat. No. 2,134,823 describes a 1938 ladder rack which is side mounted and includes a complex clamping lever. U.S. Pat. No. 3,877,624 describes a ladder rack involving a plurality of bows which transverse the top of a closed truck, wherein one of the bows has clamps to clamp ladders. The bows are independently attached to the vehicle and are not connected in any fashion. Further, they appear not to be adaptable to cargo beds for carrying items having lengths greater than the cargo bed.

U.S. Pat. No. 4,390,117 describes a ladder rack for vehicles involving parallel side members and transverse cross members. It is adapted for mounting on the roof of a vehicle and, again, would not be effective for a pick-up bed. Also, complex rack attachment and ladder attachment mechanisms are included which are much more expensive and cumbersome than the present invention.

U.S. Pat. No. 4,444,427 teaches an auxiliary structured element for pick-up cargo beds which includes a four sided frame and subsequent cross members for mounting a deck, e.g. a top with an access door.

U. S. Pat. No. 4,984,837 is directed to a load support assembly for pick-up trucks. This device has vertical mounting supports and a tiltable load support cross member. It is used for transporting items in the cargo bed tilted upwardly and forwardly; it is cab mounted and cannot carry lengthy items in a horizontal position.

U. S. Pat. No. 3,454,250, U.S. Pat. No. 4,230,248 and U.S. Pat. No. 4,065,092 described various types of clamping mechanisms and fasteners.

U. S. Pat. No. 5,007,568 describes a truck sidewall mounted chainsaw carrier with locking capabilities.

Notwithstanding the above prior art, the present invention universal equipment mounts and mounting rails are neither taught nor rendered obvious.

SUMMARY OF THE INVENTION

The present invention is directed to a universal equipment mount for attachment to mounting rails. The mount includes a base plate which is flat and has at least one cut-out therein. Permanently mounted to the base plate is an over-the-center clamp with an anchor strap and anchor hook which extends through the cut-out of the base. The base has opposite ends and one end is curved downwardly and inwardly for fitting over a flat horizontal rail section. When the base plate is placed with its hooked portion on one edge of a mounting rail, the anchor hook of the over-the-center clamp is placed on the opposite edge of another horizontal surface of a mounting rail and the over-the-center clamp is tightened to secure the base plate to the mount. The present invention is also directed to a mounting rail which includes at least two parallel separated base sections which have a cross section including a horizontal surface and a vertical surface. These base sections are connected by spacers and the spacers may be at right angles to the vertical surfaces and in the vertical, may be at another angle, or may even be horizontal and/or continuous. Finally, the present invention is directed to the combination of both the universal mount described above and the mounting rail.

BRIEF DESCRIPTION OF THE DRAWINGS

The present invention will be more fully appreciated when the specification herein is taken in conjunction with the drawings appended hereto, these drawings are as follows:

FIG. 3 shows a perspective planar view of a mounting rail of the present invention, attached to a cargo bed of a pick-up truck;

FIG. 4 is a top oblique view of an alternative embodiment present invention mounting rail;

FIG. 5 is a side, end view of one section of an alternative present invention mounting rail; and, FIG. 6 is a perspective front view of an enclosed universal equipment mount of the present invention, forming a tool box.

DETAILED DESCRIPTION OF THE PRESENT INVENTION

As mentioned above the present invention involves a universal equipment mount and a mounting rail, as well as both of these in combination. Thus, it is an objective of the present invention to provide a mount to which equipment may be secured, e.g. by being bolted, welded or otherwise so that the equipment can remain attached to the mount and so that the mount may be removably attached to mounting rails. It is another objective of the present invention to provide mounting rails for securing to a vehicle, table, platform, floor or otherwise for attachment of equipment mounts thereto.

It is a further objective of the present invention to provide an enclosed mount for holding valuable items as well as for locking them within a housing, as may be desired.

Figure 1:
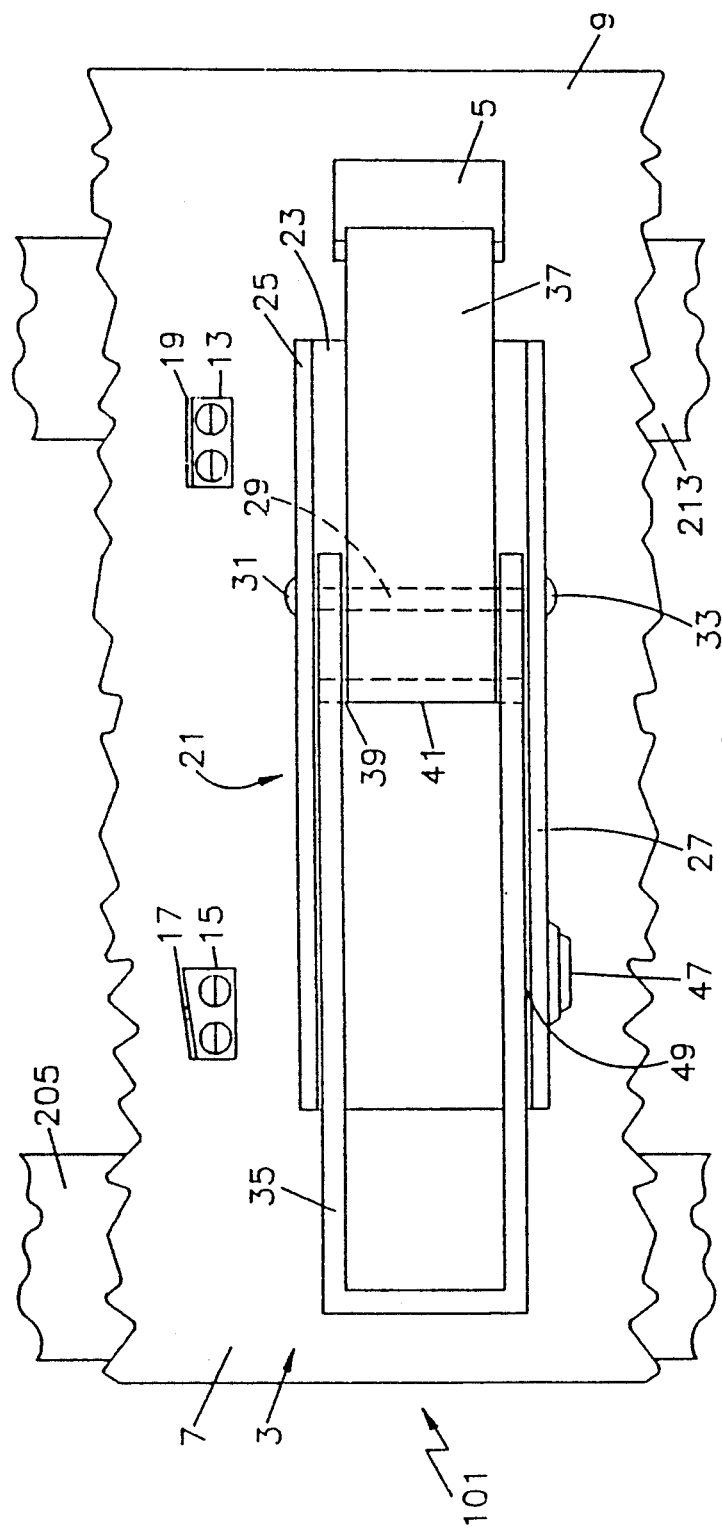
FIG. 1 shows a top view of a partially cut present invention universal equipment mount and mounting rail.
Figure 2:
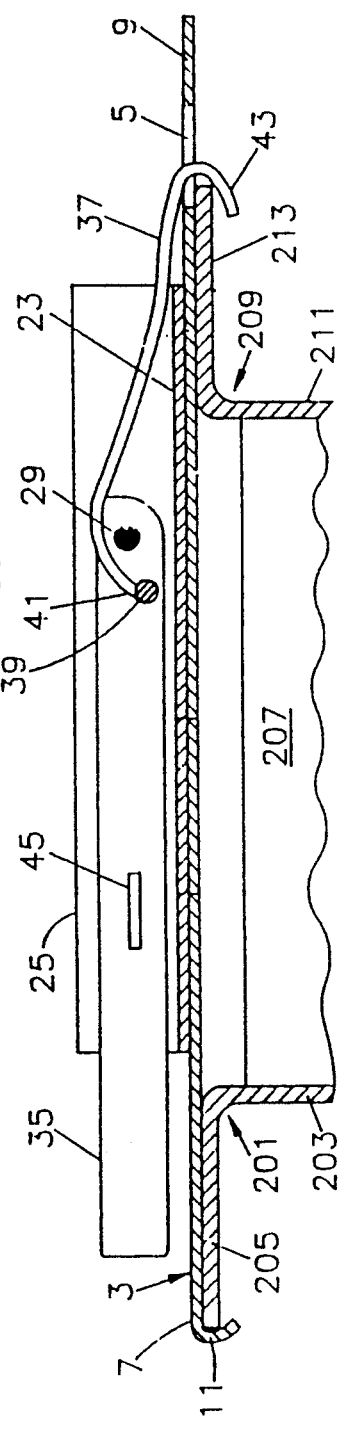
FIG. 2 shows a front cut view of the present invention device shown in FIG. 1.

Referring now to FIGS. 1 and 2 taken together there is shown a present invention universal equipment mount 101. It has base plate 3 with a first end 7 and a second, opposite end 9. First end 7 has a hooked portion 11 curved downwardly and inwardly as shown. Second, opposite end 9 has a cut-out portion 5.

Attached to the top of base plate 3 is an over-the-center clamp 21. This includes sidewalls 25 and 27 connected by bottom 23 to form an inverted "U" channel. Axle 29 passes through sidewalls 25 and 27 with caps 31 and 33 holding it in place. Latch handle 35 is rotatably connected to axle 29 as shown. Thus, latch 35 may be swung from left to right, looking at FIG. 1, the end visa versa. Latch handle 35 has rod 39 therethrough with anchor strap 37 terminating with anchor hook 43 at one end and being attached at opposite end 41 to rod 39. Because rod 39 is located away from axle 29 in the direction opposite cut-out portion 5, when latch handle 35 is brought over-the-center to the left it will pull anchor strap 37 in that direction. Thus, as shown in FIG. 2, there is a mounting rail with a first section 201 and a second section 209 having vertical surfaces 203 and 211 and horizontal surfaces 205 and 213, as shown. These sections 201 and 209 are connected by spacer plate 207.

When hooked portion 11 is attached to horizontal surface 205 and anchor hook 43 is securely fastened to horizontal surface 213, base plate 3 is tightly and securely fastened to the mounting rail. Boxes, tools, equipment, generators, pumps or any other device may be bolted or otherwise attached to base plate 3, such as by brackets 13 and 15 through uprights 17 and 19 as shown. Lock 47 and flat pin 49 may be used to engage slot 45 on latch handle 35 to lock latch handle 35 in the engaged or shut position as shown in FIG. 1.

FIG. 3 shows a mounting rail 101 on pick-up truck 141 in a perspective view. Truck 141 has cargo bed 131 and parallel walls 135 and 136 as well as front wall 145 and gate 139. Cab 147 is shown in part. Mounting rail 101 includes two parallel, separated base sections 115 and 117. These have horizontal surfaces 103 and 107 and vertical surfaces 104 and 106, respectively the horizontal surfaces 103 and 107 extend outwardly away from each other and vertical surfaces 104 and 106 face one another. These vertical surfaces are separated by commonly connected spacers 111, 113, 119 and 121. Horizontal surface 103 is bolted to top surface 133 of wall 135 and base section 117 hangs over cargo area 131. Universal equipment mounts such as described in conjunction with FIGS. 1 and 2 may readily be mounted to rail 101. Alternatively, or in addition, enclosed mounts such as are discussed below may be attached thereto.

While the above has been described with a single over-the-center clamp, the base plate may be elongated to carry such items as generators or other equipment and two or more over-the-center clamps may be used with a single base plate without exceeding the present invention.

FIG. 4 shows a top oblique view of an alternative embodiment present invention mounting rail.

Here, mounting rail 240 includes a first section with horizontal surface 241 and vertical surface 242 and a second, parallel separated base section with horizontal surface 243 and vertical surface 244. In this embodiment, inverted "U" channels 245 and 249 separate and commonly connect the base sections 237 and 239. Channels 245 and 249 have sidewalls 247, 248, 251 and 252 and bottom plates 246 and 250. The vertical walls of these channels are slotted as is exemplified by slot 256 in wall 247. Endplates such as endplate 253 may be welded to the base sections for prevention of theft by sliding equipment off rails.

FIG. 5 shows a side end view of an alternative embodiment present invention mounting rail 221. It includes two horizontal surfaces 223 and 231 and two vertical surfaces 225 and 229 a bottom plate 227 is in the horizontal plane and connects the bottoms of vertical surfaces 225 and 229, as shown. An additional spacer 233 is vertical, at right angles to the bottom plate 227. In this embodiment the horizontal surfaces 223 and 231, the vertical surfaces 225 and 229 and bottom plate 227 are all formed of a single continuous plate shaped as shown in FIG. 5 with optional spacer 233 as shown.

Figure 6:
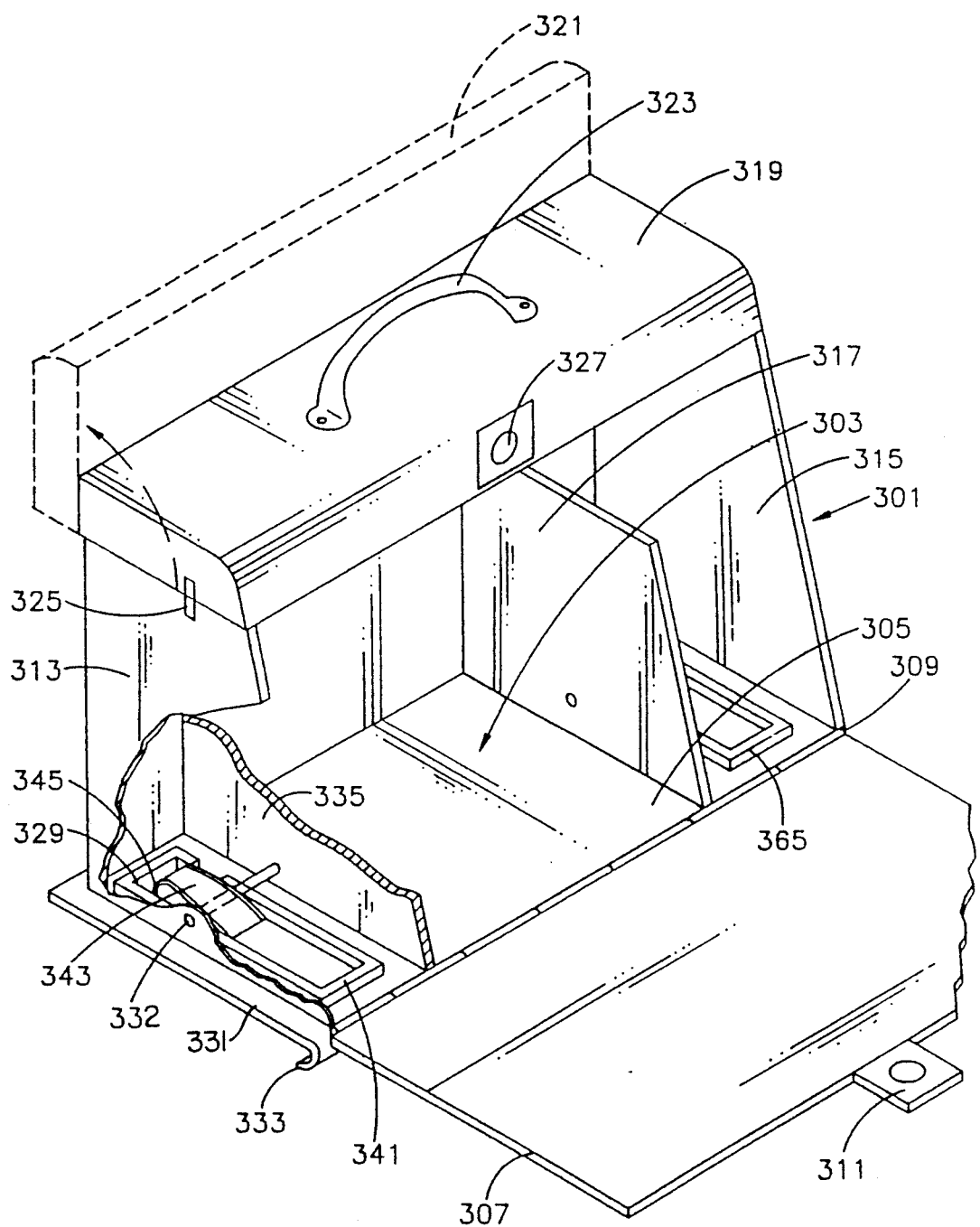

FIG. 6 shows a front perspective view of a present invention enclosed mount shown generally as 301. It includes housing 303 with bottom 305 permanently attached to base plate 331. Front wall 307 acts as a door and rotates about hinges 309. It includes lock 311, sidewalls 313 and 315 and back 317 support cover 319 (shown in its open position as cover 321). It also includes handle 323 and lock receiver 327 as well as latches such as latch 325. Inside wall 335 and outside wall 313 (cut) support axle 332 upon which latch handle 341 rotates. Anchor strap 343 and anchor hook 345 are extending from latch handle 341 into cut-out 329 for attachment to a mounting rail at one edge. Base plate 331 has a curved portion 333 which hooks downwardly and inwardly for attachment to another mounting rail edge. Over-the-center clamp 365 is supported by inside wall 317 and outside wall 315 and is identical to the one already described herein and functions in a like manner.

Obviously, numerous modifications and variations of the present invention are possible in light of the above teachings. It is therefore understood that within the scope of the appended claims, the invention may be practiced otherwise than as specifically described herein.

What is claimed is:

1. A universal equipment mount for attachment to mounting rails, which comprises:
   (a) a base plate being substantially flat and being adapted to receive equipment by permanent or temporary attachment thereto, said base plate having a top and a bottom and a first end and an opposite, second end, said first end having a hooked portion curved downwardly and inwardly for fitting over a flat, horizontal mounting rail section, said second, opposite end having a cut-out portion for passing therethrough an attachment end of an over-the-center clamp;
   (b) an over-the-center clamp permanently attached to the top of said base plate, said over-the-center clamp having two sidewalls, a pivot axle located between and movably attached to said sidewalls, a latch handle rotatably mounted on said axle and an anchor strap terminating with an attachment end having an anchor hook and, at its opposite end being attached to said latch handle to one side of side axle and extending over said axle to an opposite side, extending said attachment end through the cut-out portion of said base plate.

2. The mount of claim 1 wherein said anchor strap is a flexible strip of metal.

3. The mount of claim 1 wherein said anchor strap is a synthetic plastic strap.

4. The mount of claim 1 wherein said sidewalls are formed of an inverted "U" channel.

5. The mount of claim 1 wherein said base plate is elongated and further includes at least a second cut-out portion on said base plate and at least a second over-thecenter clamp permanent attached to the top of said base plate with an anchor strap and anchor hook extending through said second cut-out portion.

6. The mount of claim 1 further including a housing connected to said base plate and enclosing said over-the-center clamp.

7. The mount of claim 6 wherein said housing has sides, a front and a back, at least one of which is hinged and opens and closes.

8. The mount of claim 6 wherein said housing has at least one inside wall to divide said housing into compartments and said inside wall forms a sidewall of said over-the-center clamp.

9. The mount of claim 6 wherein said housing is lockable.

10. A combination universal equipment mount and mounting rail, which comprises:
   (a) a base plate being substantially flat and being adapted to receive equipment by permanent or temporary attachment thereto, said base plate having a top and a bottom and a first end and an opposite, second end, said first end having a hooked portion curved downwardly and inwardly for fitting over a flat, horizontal mounting rail section, said second, opposite end having a cut-out portion for passing therethrough an attachment end of an over-the-center clamp;
   (b) an over-the-center clamp permanently attached to the top of said base plate, said over-the-center clamp having two sidewalls, a pivot axle located between and movably attached to said sidewalls, a latch handle rotatably mounted on said axle and an anchor strap terminating with an attachment end having an anchor hook and, at its opposite end being attached to said latch handle to one side of side axle and extending over said axle to an opposite side, extending said attachment end through the cut-out portion of said base plate; and
   (c) a mounting rail having two parallel, separated base sections, each such section having a cross section which includes a horizontal surface and a vertical surface, said base sections being indirectly connected to each other with its horizontal surfaces extending away from the other to which it is connected, and being connected by a plurality of commonly connected spacers, so as to create two parallel horizontal mounting surfaces adjacent to but spaced away from one another to form a platform for attachment of equipment mounts for mounting of items to be transported;
   wherein said hooked portion of said base plate is attached to an outer edge of a horizontal surface of one base section of said mounting rail and the anchor hook of said over-the-center clamp is attached to an outer edge of a horizontal surface of the other base section of said mounting rail.

11. The combination universal equipment mount and mounting rail of claim 10, wherein further including a housing connected to said base plate and enclosing said over-the-center clamp.

12. A combination universal equipment mount and mounting rail of claim 10, wherein said housing has sides, a front and a back, at least one of which is hinged and opens and closes.

13. A combination universal equipment mount and mounting rail of claim 10, wherein said housing has at least one inside wall to divide said housing into compartments and said inside wall forms a sidewall of said over-the-center clamp.

14. A combination universal equipment mount and mounting rail of claim 10, wherein said housing is lockable.

* * * * *